No. 614,642. Patented Nov. 22, 1898.
F. P. WILSON.
BICYCLE SUPPORT.
(Application filed Feb. 2, 1898.)
(No Model.)
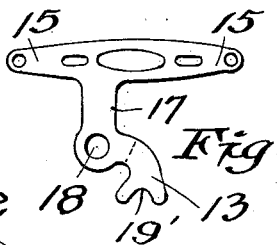
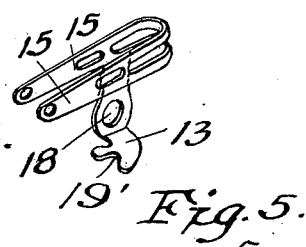
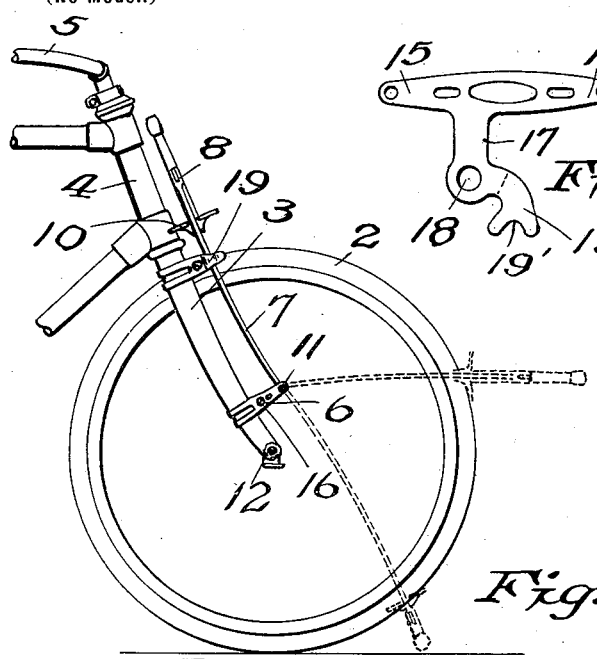
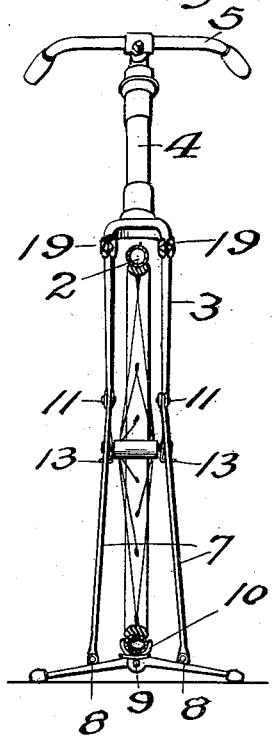
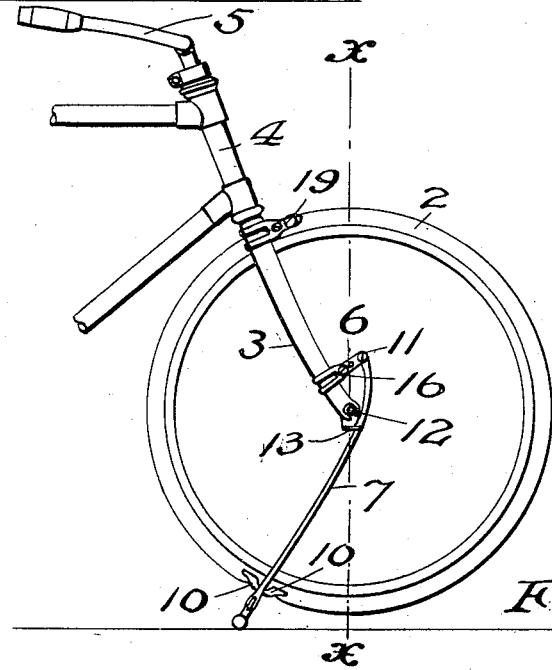
Witnesses:
O. E. Van Dolen
W. C. Gooley
Inventor:
Freeman P. Wilson
By Paul Hawley
his attorneys.

UNITED STATES PATENT OFFICE.

FREEMAN P. WILSON, OF MINNEAPOLIS, MINNESOTA, ASSIGNOR OF ONE-HALF TO GEORGE W. SAWYER, OF SAME PLACE.

BICYCLE-SUPPORT.

SPECIFICATION forming part of Letters Patent No. 614,642, dated November 22, 1898.

Application filed February 2, 1898. Serial No. 668,804. (No model.)

*To all whom it may concern:*

Be it known that I, FREEMAN P. WILSON, of the city of Minneapolis, county of Hennepin, State of Minnesota, have invented certain new and useful Improvements in Bicycle-Supports, of which the following is a specification.

This invention relates to bicycle-supports, and particularly to that class of devices which are carried upon the wheel and are intended to be thrown down into contact with the ground when the rider dismounts and wishes to leave his wheel.

The object of the invention is to provide a small and compact bicycle-support adapted for arrangement upon or in connection with the front fork of an ordinary bicycle and so constructed that when thrown forward over the wheel it will be opened or expanded by the movement of the wheel and will furnish a wide support upon opposite sides of the front wheel to prevent the bicycle from toppling in either direction.

A further object of the invention is to provide a device which will have a neat appearance and which will be of light weight.

The invention consists generally in pivoted rods adapted to be secured upon a bicycle-fork and having their outer ends connected by a pair of pivoted links which are adapted to be expanded or opened to form a cross-bar.

The invention further consists in particular constructions and in combinations of parts, all as hereinafter described, and particularly pointed out in the claims.

The invention will be more readily understood by reference to the accompanying drawings, forming part of this specification, and in which—

Figure 1 is a side elevation of the front portion of a bicycle with my invention attached thereto. Fig. 2 is a similar view showing the bicycle-support thrown down in position to hold the bicycle. Fig. 3 is a sectional view substantially on the line $x\ x$ of Fig. 2. Fig. 4 is a view of the blank from which I form the fork-fixtures. Fig. 5 is a perspective view of one of the fork-fixtures.

As shown in the drawings, 2 represents the front wheel of a bicycle, 3 the fork, and 4 the front portion of the bicycle-frame.

5 represents the handle-bar.

Upon the lower end of each arm of the fork 3 I arrange a suitable clip or fixture 6, the construction of which will be hereinafter described. On each of these I pivot the lower end of a short rod 7. The upper ends of these rods are joined by the device comprising the two links 8 8, having their ends secured by a pivot-pin 9 and adapted to be extended, as shown in Figs. 2 and 3. These arms are provided with flanges 10, which together form a yoke to receive and hold the tire of the bicycle. The rods 7 are pivoted to links 8 at intermediate points thereon, and the distance between the pivot-points 11 on the fixtures 6 and the inner ends of the links 8 when they are folded, as shown in Fig. 1, is less than the diameter of the wheel, so that when the rods 7 are thrown forward the inner ends of the links 8 will strike the tire, as shown by dotted lines in Fig. 1, and as the wheel is rotated the links will be carried downwardly and will be automatically distended, as indicated by the second set of dotted lines in Fig. 1. When the arms are distended, there is sufficient space between the pivots 11 and the arms 8 to allow the arms or bars 8 to pass around beneath the lower part of the wheel, and, passing back of the center 12 of the wheel, they will stand as shown in Fig. 2. Further movement is prevented by brackets 13, formed upon the fixtures 6 and against which the rods bear at points between the pivots 11 and the cross-bars or links 8. The weight of the wheel is exerted at a point forward of the cross-bars, and hence there is no tendency of the wheel to move backwardly and away from the support. The wheel is held at three points—namely, in the yoke 10, formed by the parts on the two links 8, and the two pivots 11 upon the fork. The wheel therefore is quite rigidly held and the weight of the machine rests upon the rear wheel and the outer ends of the two links 8. The fixture which I prefer to employ is illustrated in Figs. 4 and 5. As there shown, it comprises the arms 15, which extend upon opposite sides of the arm of the fork and are secured by a rivet or bolt 16. From one of these, preferably the inside arm 15, there is an extension 17, which has a hole 18 in its lower end for the axle or shaft of the front wheel, on which it is secured. The extension 13 is bent at right angles to the part 17 and has a notch 19' to receive the rod 7, which is secured between the outer ends of the arms 15 by a suitable rivet or bolt. This fixture is mostly concealed within the fork and does not destroy the neat appearance of the wheel.

To steady the device upon the fork, I preferably provide two clips 19, one on each side of the fork and adapted to receive and hold the opposite rods 7.

Having thus described my invention, I claim as new and desire to secure by Letters Patent—

1. The combination, with the bicycle-fork and front wheel, of the fixture secured upon an intermediate part of the fork and held by the shaft or axle of said front wheel and provided with an extension 13, the rod 7 pivoted upon said fixtures, the pivoted links 8 at intermediate points upon which the free ends of said rods 7 are pivoted, and the yoke forming parts upon said links, substantially as described.

2. The combination, in a bicycle-support, of suitable fixtures, with rods pivoted thereon to be thereby secured to the bicycle-fork, distensible links pivotally connected with the other ends of said rods and adapted, when distended, to clamp the wheel and pass beneath and back of the center thereof and raise the wheel above the floor, and stops arranged upon the forks of the wheel in position to engage said rods and thereby limit the backward movement of said links beneath the wheel, substantially as described.

3. The combination, in a bicycle-support, of suitable fixtures, with rods pivoted thereon to be thereby secured to the bicycle-fork, distensible links pivotally connected with the other ends of said rods and flanges provided at the inner ends of said links and forming jaws to receive the wheel and clamp the same with increasing pressure as said links are distended, stops arranged upon the bicycle-fork and comprising arms 15, an extension 17 having a hole 18 and a second extension 13 substantially at right angles to said extension 17, substantially as described.

FREEMAN P. WILSON.

Witnesses:
C. G. HAWLEY,
M. E. GOOLEY.